United States Patent
Leach et al.

(10) Patent No.: US 11,730,173 B2
(45) Date of Patent: Aug. 22, 2023

(54) RAISED BOTTOM COLD BREWER AND METHOD USING SAME

(71) Applicant: Toddy, LLC, Loveland, CO (US)

(72) Inventors: Julia Leach, Denver, CO (US); Clint Kolda, Loveland, CO (US)

(73) Assignee: TODDY, LLC, Loveland, CO (US)

( * ) Notice: Subject to any disclaimer, the term of this patent is extended or adjusted under 35 U.S.C. 154(b) by 0 days.

(21) Appl. No.: 17/209,070

(22) Filed: Mar. 22, 2021

(65) Prior Publication Data

US 2021/0307351 A1 Oct. 7, 2021

Related U.S. Application Data

(60) Continuation-in-part of application No. 16/532,008, filed on Aug. 5, 2019, now Pat. No. 10,952,453, which is a division of application No. 15/630,463, filed on Jun. 22, 2017, now Pat. No. 10,368,560.

(60) Provisional application No. 62/369,540, filed on Aug. 1, 2016.

(51) Int. Cl.
| | | |
|---|---|---|
| A47J 31/44 | (2006.01) | |
| A47J 31/06 | (2006.01) | |
| A23F 5/18 | (2006.01) | |
| A23F 5/26 | (2006.01) | |
| A23F 3/20 | (2006.01) | |
| A47J 31/46 | (2006.01) | |
| A23F 3/18 | (2006.01) | |

(52) U.S. Cl.
CPC .......... *A23F 3/20* (2013.01); *A23F 3/18* (2013.01); *A23F 5/18* (2013.01); *A23F 5/26* (2013.01); *A47J 31/06* (2013.01); *A47J 31/446* (2013.01); *A47J 31/467* (2013.01)

(58) Field of Classification Search
CPC ...... A23F 3/18; A23F 3/20; A23F 5/18; A23F 5/26; A47J 31/06; A47J 31/446; A47J 31/467
See application file for complete search history.

(56) References Cited

U.S. PATENT DOCUMENTS

| | | | |
|---|---|---|---|
| 1,491,730 A | 4/1924 | Oldham | |
| 1,845,947 A | 2/1932 | Weisner | |
| 2,628,553 A * | 2/1953 | Titus | A47J 31/057 99/302 R |
| 4,069,751 A | 1/1978 | Gronwick | |

(Continued)

FOREIGN PATENT DOCUMENTS

| | | | |
|---|---|---|---|
| CA | 2671201 | * | 1/2010 |
| CN | 13976655 | * | 8/2014 |

(Continued)

OTHER PUBLICATIONS

English translation for CN13976655 published Aug. 2014.*

*Primary Examiner* — Anthony J Weier
(74) *Attorney, Agent, or Firm* — Francisco A. Rubio-Campos; Intelink Law Group, P.C.

(57) ABSTRACT

Described is a raised bottom cold brewing system comprising a bucket having a top side, a cavity, a platform within the cavity, and a bottom side, a lid configured to be placed on top side of the bucket, and a faucet. The bottom side of the bucket includes a raised bottom and a channel surrounding the raised bottom, the platform includes a plurality of openings, and the faucet is below the platform and above the raised bottom and channel.

18 Claims, 17 Drawing Sheets

(56) References Cited

U.S. PATENT DOCUMENTS

| | | | |
|---|---|---|---|
| 5,165,569 A * | 11/1992 | Furuhashi | B65D 7/045 |
| | | | 220/4.12 |
| 8,720,321 B2 | 5/2014 | Neace, Jr. | |
| 9,629,493 B2 | 4/2017 | Belanich | |
| 10,106,393 B1 | 10/2018 | Russell | |
| 10,368,560 B2 * | 8/2019 | Leach | A23F 3/20 |
| 10,952,453 B2 * | 3/2021 | Leach | A23F 3/18 |
| 2002/0083840 A1 | 7/2002 | Lassota | |
| 2004/0011350 A1 * | 1/2004 | Dowst | A47J 27/022 |
| | | | 126/344 |
| 2008/0237260 A1 | 10/2008 | Wolek | |
| 2012/0021108 A1 | 1/2012 | Baumann | |
| 2016/0270587 A1 | 9/2016 | Yu | |
| 2016/0296062 A1 | 10/2016 | Gross | |
| 2016/0338522 A1 | 11/2016 | van Schyndel | |
| 2016/0353761 A1 | 12/2016 | Paul | |
| 2017/0000289 A1 | 1/2017 | Feber | |

FOREIGN PATENT DOCUMENTS

| | | | |
|---|---|---|---|
| CN | 207685237 | * | 8/2018 |
| CN | 207918784 | * | 9/2018 |
| CN | 110713896 | * | 1/2020 |

* cited by examiner

RAISED BOTTOM COLD BREWER AND METHOD USING SAME

CLAIM OF PRIORITY

The present application is a continuation-in-part (CIP) of and claims priority to U.S. patent application Ser. No. 16/532,008 filed on Aug. 5, 2019, now U.S. Pat. No. 10,952,452 that is a divisional of U.S. Non-Provisional application Ser. No. 15/630,463 filed on Jun. 22, 2017, now U.S. Pat. No. 10,368,560 which claims priority to U.S. Provisional Application No. 62/369,540, as filed Aug. 1, 2016. The entire contents of these three priority applications are incorporated herein by reference in their entirety for all they disclose and teach.

BACKGROUND

1. Field

The present disclosure is related to systems and methods for brewing coffee or tea.

2. Related Art

Cold brewing of coffee, tea and other water-soluble organic materials has been a popular procedure. Good tasting drinks are created in this manner.

SUMMARY

Disclosed is a raised bottom cold brewing system comprising a bucket having a top side, a cavity, a platform within the cavity, and a bottom side, a lid configured to be placed on top side of the bucket, and a faucet. The bottom side of the bucket includes a raised bottom and a channel surrounding the raised bottom, the platform includes a plurality of openings, and the faucet is below the platform and above the raised bottom and channel.

Also disclosed is a method of brewing a brewed effluent in the raised bottom cold brewing system that removes harsh acids and harsh oils in the brewed effluent. The method comprises: placing an organic material, used to create the brewed effluent, in a filter bag; placing the filter bag on a platform disposed in a bucket having a raised bottom and a channel, the platform having a curved surface that is curved downwardly towards a middle portion of the platform so that effluent drains towards a central portion of the platform and the effluent is concentrated towards a middle portion of the filter bag to facilitate yield; placing water in the bucket that interacts with the organic material to create the brewed effluent; drawing the brewed effluent from the bucket to a minimum effluent level, using a faucet disposed in the bucket below the platform and approximately at a top of the channel, wherein the curved surface of the platform is above the minimum effluent level; allowing the organic material to drain for a period of time after the brewed effluent is drained to the minimum effluent level; allowing any sediment from the organic material to settle into the channel; and removing the filter bag without squeezing or pushing on the filter bag to prevent the harsh oils and the harsh acids from entering the brewed effluent.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Disclosed is a raised bottom cold brewing system comprising a bucket having a top side, a cavity, a platform within the cavity, and a bottom side, a lid configured to be placed on top side of the bucket, and a faucet. The bottom side of the bucket includes a raised bottom and a channel surrounding the raised bottom, the platform includes a plurality of openings, and the faucet is below the platform and above the raised bottom and channel.

Also disclosed is a method of brewing a brewed effluent in the raised bottom cold brewing system that removes harsh acids and harsh oils in the brewed effluent. The method comprises: placing an organic material, used to create the brewed effluent, in a filter bag; placing the filter bag on a platform disposed in a bucket having a raised bottom and a channel, the platform having a curved surface that is curved downwardly towards a middle portion of the platform so that effluent drains towards a central portion of the platform and the effluent is concentrated towards a middle portion of the filter bag to facilitate yield; placing water in the bucket that interacts with the organic material to create the brewed effluent; drawing the brewed effluent from the bucket to a minimum effluent level, using a faucet disposed in the bucket below the platform and approximately at a top of the channel, wherein the curved surface of the platform is above the minimum effluent level; allowing the organic material to drain for a period of time after the brewed effluent is drained to the minimum effluent level; allowing any sediment from the organic material to drain into the channel; and removing the filter bag without squeezing or pushing on the filter bag to prevent the harsh oils and the harsh acids from entering the brewed effluent.

Figure 1:
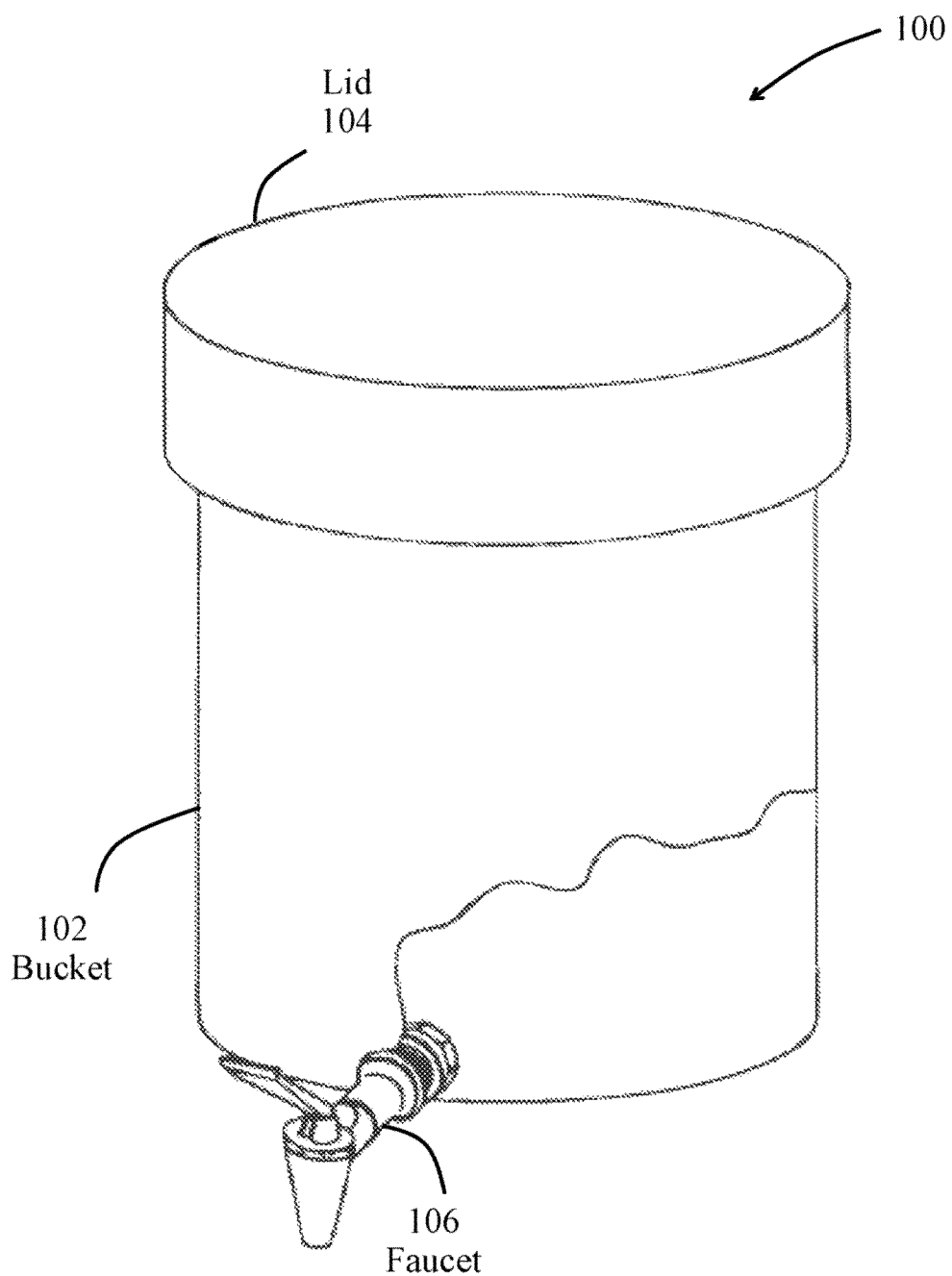
FIG. 1 is an isometric view of an implementation of an example of a cold brewing system in accordance with the present disclosure.

FIG. 1 is an isometric view of a cold brewing system that comprises an embodiment of the present invention. As illustrated in FIG. 1, the brewing system 100 comprises a bucket 102 that has a lid 104. A faucet 106 is used to drain the brewed contents (brewed effluent) from the bucket 102. Coffee grounds, tea, or other organic material 111 is placed in the bucket 102 and room temperature water is added to the bucket. The water is allowed to remain in the bucket for a period of time to create a brewed effluent, which can be drained by the faucet 106. The cold brewing process provides for a brewed effluent 118 that has a pleasing taste, since the cold brewing process, i.e., using room temperature water, extracts the favorable flavoring from the organic materials 111. In contrast, hot brewing tends to extract many acids, harsh tannins and other harsh oils that negatively affect the taste of the brewed effluent.

Figure 2:
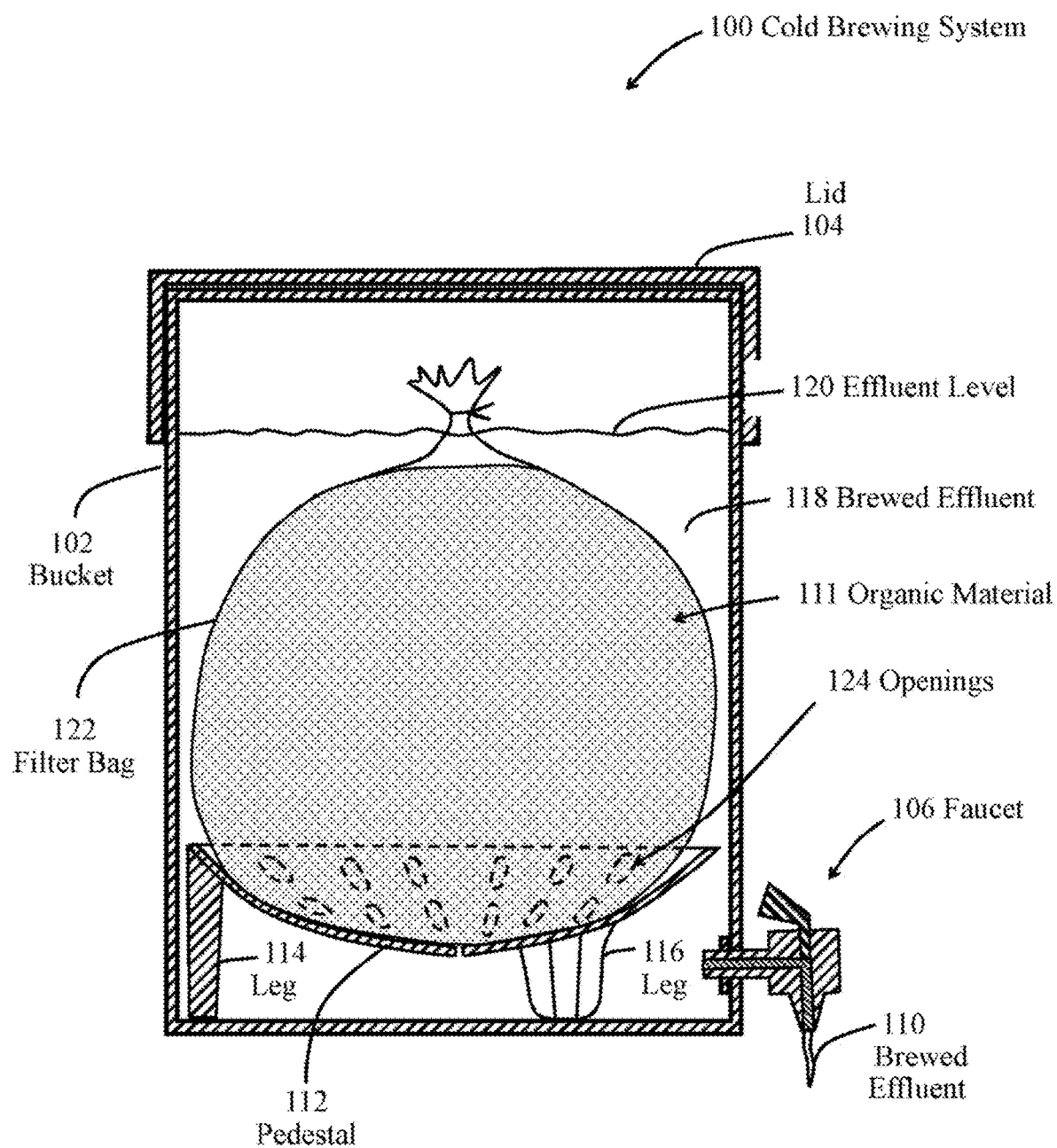
FIG. 2 is a cross-sectional view of the embodiment of FIG. 1 filled with water.
Figure 6:
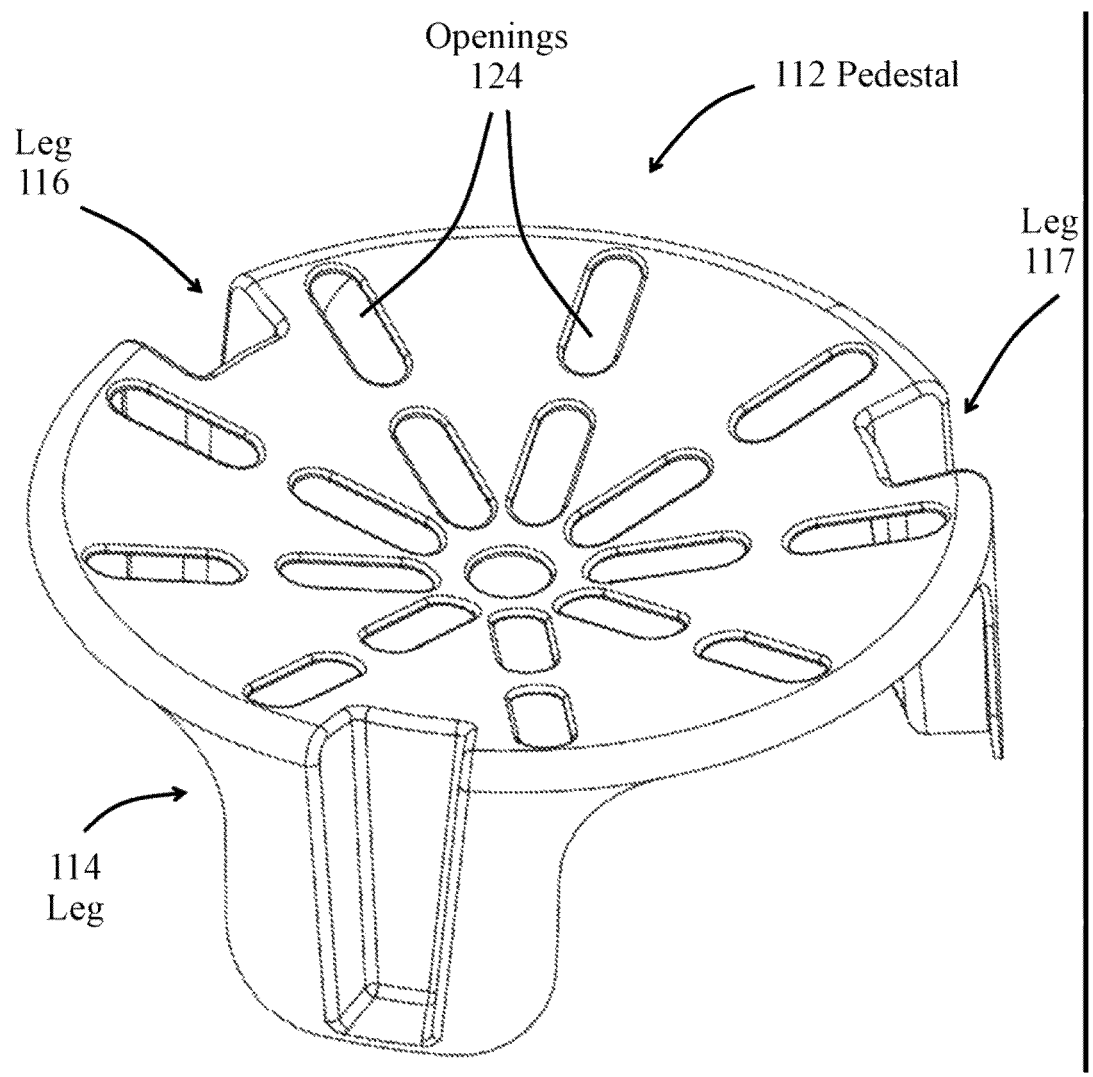
FIG. 6 is an isometric view of an implementation of an example of a pedestal of the embodiment of FIG. 1 in accordance with the present disclosure.

FIG. 2 is a sectional view of the cold brewing system 100 of FIG. 1. As illustrated in FIG. 2, the cold brewing system 100 has a bucket 102 and a lid 104. A faucet 106 is inserted through the wall of the bucket 102 to drain the brewed effluent 118, which is the product of the brewing process. A filter bag 122 is placed in the bucket 102 on a pedestal 112. In prior art devices, a separate net bag that surrounds the filter bag 122 was used for added stability to ensure that the filter bag 122 will not break when being removed from the bucket 102, as a result of the additional weight of effluent that has not been fully drained through the filter bag. Water is placed in the bucket 102 to the effluent level 120, which surrounds the filter bag 122 and the organic material 111 that is in the filter bag 122. The organic material can be any desired organic material, including ground coffee beans, tea, or other organic material that can release flavorful effluents for consumption as a beverage or for medicinal purposes. The water can be room temperature water or may vary only slightly in temperature above or more significantly below room temperature, hence "cold brewing." The water interacts with the organic material 111 and produces the brewed effluent 110. In essence, the water extracts the favorable flavorings of the organic material 111 with very few acids or harsh tannins or oils. A typical brewing process may take anywhere from several hours up to 24 hours. Filter bag 122 sits on a pedestal 112, which is curved downwardly toward the center of the pedestal 112. Pedestal 112 has a series of openings 124, which allow the filter bag 122 to sit on pedestal 112 in a curved or sloped configuration to create maximum yield. Pedestal 112 has three legs, two of which are shown as legs 114, 116 in the sectional view of FIG. 2. The third leg 117 is shown in FIG. 6. Faucet 106 is used to drain the effluent 118 from the bucket 102 and drain the brewed effluent 110 into another container after the brewing process is completed. Since the faucet 106 is capable of draining most of the effluent from the bucket, and the organic material 111 in the filter bag 122 is on the pedestal 112, and does not sit in the brewed effluent 110, it is no longer critical that the filter bag 122 does not break, since most of the effluent is drained out of the bucket when the filter bag 122 is removed from the bucket. In other words, the brewed effluent 110 is drained from the bucket before the filter bag 122 is removed. If the filter bag 122 breaks during the removal of the filter bag 122, the entire contents can simply be dumped in a trash container and very little effluent will be lost. This constitutes another advantage of using the pedestal 112 to allow the effluent 110 to be drained from the organic material 111.

Figure 3:
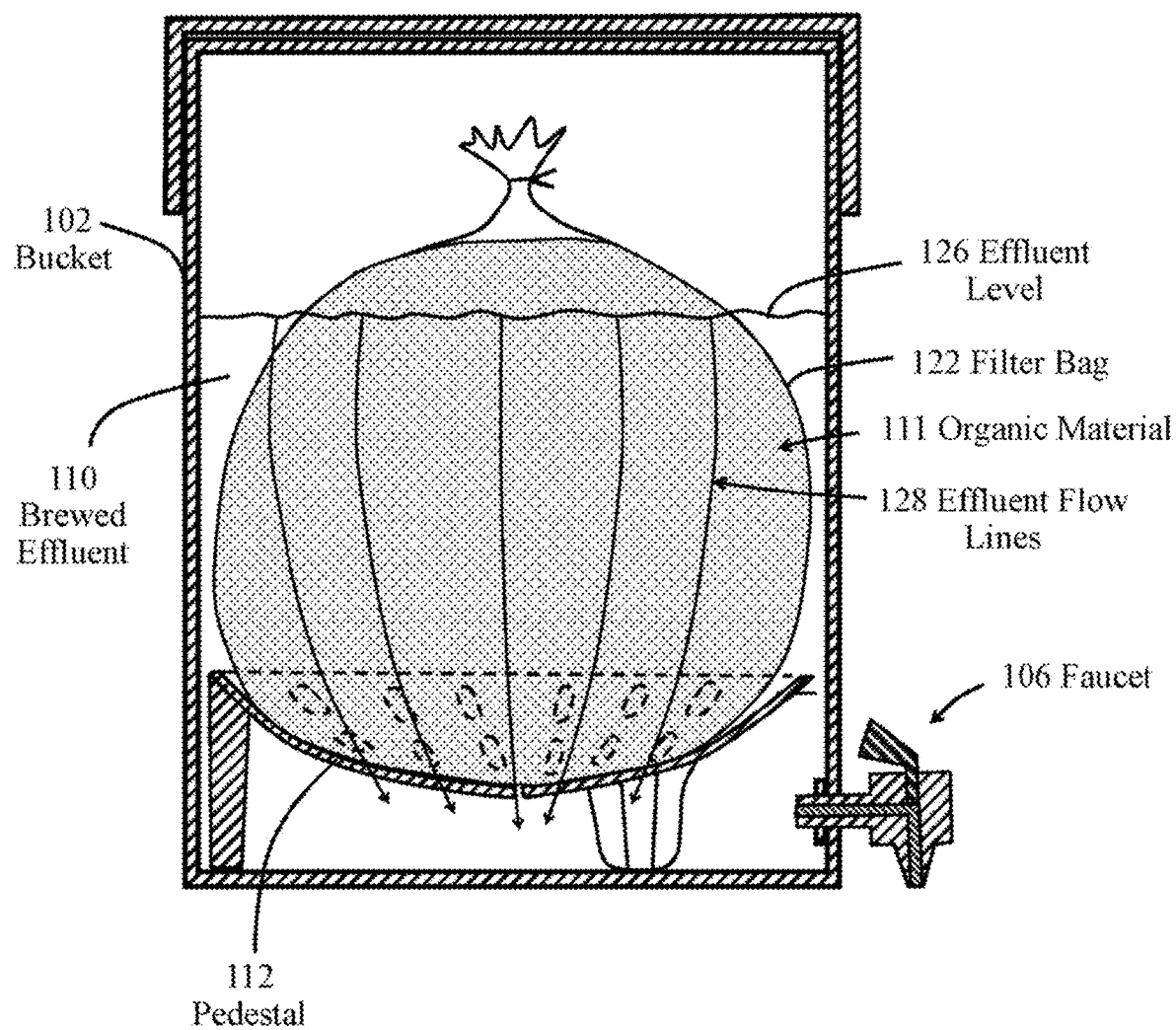
FIG. 3 is a cross-sectional view of the embodiment of FIG. 1, showing the brewing system partially filled with water.

FIG. 3 is another cross-sectional view, similar to FIG. 2, with some of the brewed effluent 110 drained from the bucket 102 using faucet 106. As illustrated in FIG. 3, the effluent flows along the effluent fill lines 128 as the effluent is drained to effluent level 126. In that regard, the brewed effluent 110 may be drained in stages. The brewed effluent 110 may be drained to the effluent level 126 and left to drain for a period of time, so that the effluent flows along the effluent flow lines 128 through a central portion of the organic material to increase the extraction of the favorable materials from the organic material 111. In that regard, the concentration of the brewed effluent 110 is increased because of the effluent flow lines 128 that pass through a central portion of the filter bag 122.

Figure 4:
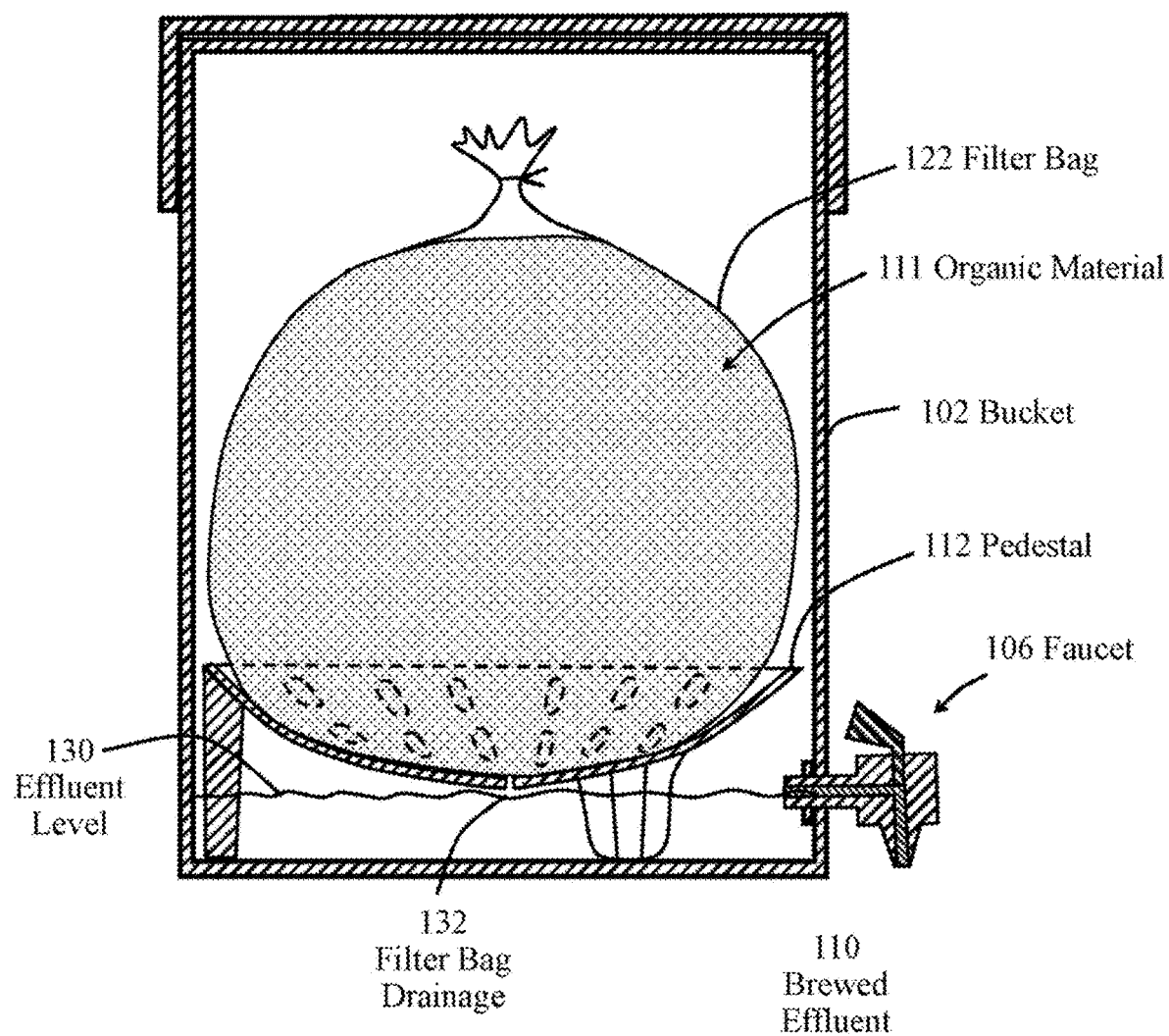
FIG. 4 is a cross-sectional view of the embodiment of FIG. 1, with the water drained to the lowest level allowed by the spigot.

FIG. 4 is a cross-sectional view of the brewing system 100 of the embodiment of FIG. 1 with the effluent 118 drained to a minimum effluent level 130, which is the lowest level to which the effluent 118 can be drained by the faucet 106. The cross-sectional view illustrated in FIG. 4 is a view directly after the effluent 118 is drained by the faucet 106. As shown in FIG. 4, the organic materials have absorbed much of the effluent 118 and remain in an expanded condition in the filter bag 122. Drainage 132 from the filter bag drains into the effluent 118 that is below the level of the faucet 106. The central bottom portion of the pedestal 112 is located above the minimum effluent level 130, which is the lowest effluent level when the brewed effluent 118 is drained by the faucet 106.

With the brewed effluent 118 at the level 130 shown in FIG. 4, the effluent that has been absorbed by the organic material 111 slowly drains from the filter bag 120 to produce the filter bag drainage 132. This causes the effluent level 130 to increase. The space in-between the bottom of the pedestal 112 and the minimum effluent level 130 is sufficient to allow the organic material 111 to drain or mostly drain from the filter bag 122. Of course, the spacing between the minimum effluent level 130 and the bottom of the pedestal 112 varies according to the size of the system 100 and the amount of organic material. Typically, the space between the bottom of the pedestal 112 and the effluent level 130 can be a half to ¾ of an inch. This space permits undesirable sediment from the organic material to collect without becoming part of the concentrate. The sediments that collect in this space between the bottom of the bucket and the lower portion of the faucet 106 are very fine sediments that are too small to be filtered out by the filter bag. As illustrated in FIG. 3, the curved shape of the pedestal 112 causes forces to be exerted on the bottom portion of the filter bag 122 in an inward direction, which causes the effluent flow lines 128 to be curved inwardly. This is a result of the inwardly directed forces on the filter bag 128 created by the curved shape of the pedestal 112, which creates pressure along the curved surface of the filter bag 122 that rests on the curved surface of the pedestal 112. The curved effluent flow lines 128, that indicate the flow of the effluent, causes the effluent to be filtered by the organic material 111 and concentrated prior to passing through the filter bag 122. As shown in FIG. 4, the effluent is drained from the organic material 111 through the filter bag 122 to the effluent level 130. Typically, very fine sediment is left in the bucket 102 in the effluent that is below the effluent level 130. This very fine sediment is not filtered by the filter bag 122 and can be considered to be undesirable by some cold coffee drinkers. Therefore, these fine sediments are left in the bottom of the bucket 102 after the filter bag 122 has drained. When the bag is removed from the bucket 102, a sufficient amount of effluent will have drained from the organic material 111, so that the chance of breakage of the filter bag 122 is low. However, if the filter bag 122 does break, the organic material 111 simply falls on the pedestal 112 and possibly into the undesirable effluent below the effluent level 130 and can be properly disposed.

Figure 5:
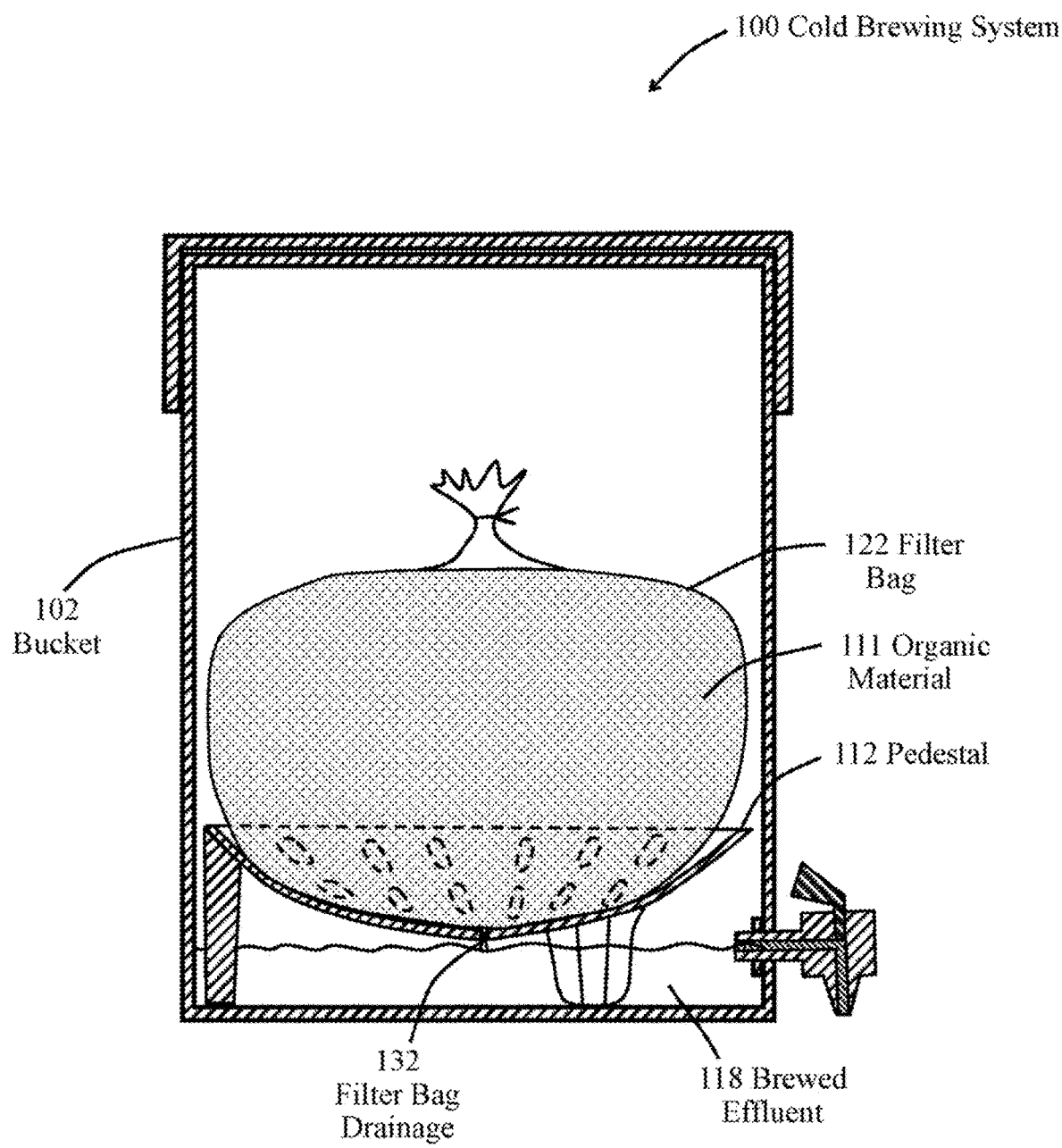
FIG. 5 is another cross-sectional view of the embodiment of FIG. 1 with most of the brewed effluent drained from the organic material.

FIG. 5 is another cross-sectional view of the brewing system 100 with most of the brewed effluent 118 drained from the organic material 111. As illustrated in FIG. 5, the filter bag 122 contains the organic material 111 that has been drained, as filter bag drainage 132, into the bottom of the bucket 102. Organic material may be allowed to drain for several minutes to several hours until most of the brewed effluent 118 is drained from the organic material 111. This process has two beneficial effects. First, the weight of the organic material 111 in the filter bag 122 is significantly reduced, which allows the filter bag 122 to be easily removed from the bucket 102 with minimal risk of tearing or ripping the filter bag 122. In previous systems, a supporting net bag was required to be used around the filter to ensure that the filter did not rip when removing the filter from the bucket 102. Additionally, a prevalent method used in prior systems was to squeeze the filter to remove the excess effluent that has been absorbed by the organic material 111. A user may typically lift the bag and squeeze it, or push down on the bag, to squeeze out excess effluent. This process would often cause the bag to tear, which would essentially ruin the effluent left in the bucket 102. Accordingly, a nylon or plastic net bag was typically used in previous systems, which added to the expense and complexity of the system. By squeezing the bag, it became easier to remove the bag, because it was lighter, and the amount of the brewed effluent was increased. What was not realized by these operators is that undesirable harsh acids, harsh tannins, and harsh oils were also squeezed from the organic material 111 and became part of the brewed effluent 118. These harsh materials degraded the taste of the resultant beverage and, in general, lowered the quality of the brewed effluent 118. In addition, the beverages generated out of the effluent constitute food grade beverages, which can be contaminated by the hands of the user, which may contain bacteria and viruses and may violate health codes. If the user attempts to lift the filter bag 122, as illustrated in FIG. 4, prior to the time that any significant amount of effluent has drained from the organic material 111, the weight of the bag will typically exceed the strength limitations of the bag, necessitating either the use of a supporting mesh bag, or requiring the user to push down on the filter bag 122 to reduce the weight. So, the process of allowing the filter to drain on its own reduces the weight of the organic material 111 in the filter bag 122, which lessens the chance of a rip or breakage of the filter bag, provides more effluent that does not contain nasty oils and acids from the organic material 111, and is more sanitary, since the user does not use his or her grubby hands to squeeze the effluent from the filter bag 122 of FIG. 5. After filter bag 122 has been drained of brewed effluent 118, filter bag 122 then can be easily and safely picked up and removed by a single user, and there is not a large probability that the filter bag 122 will tear or rip, since the organic material 111 is significantly lighter. In addition, the user's grubby hands are not immersed in the effluent by pushing or squeezing the filter bag 122.

FIG. 6 is an isometric view of the pedestal 112. As shown in FIG. 6, there are a series of openings 124 in the curved upper surface of the pedestal that allow effluent to flow from the filter bag 122 through the pedestal 112. The pedestal 112 has three legs, legs 114, 116, 117. Each of the legs is formed with an indentation in the upper surface of the pedestal 112, which provides both strength to the legs 114, 116, 117, and creates an opening that allows a user to grasp the pedestal 112 with one or more fingers.

The curvature of the surface of the pedestal 112 causes the brewed effluent 118 to drain through the organic material 111 and funnel toward the center of the filter bag 122. See FIG. 4. As indicated above, the effluent tends to collect toward the center and flow through a greater portion of the organic material 111 to create a richer and stronger effluent, as a result of the curved surface of the pedestal 112. This process occurs without releasing any of the harsh oils and acids from the organic materials 111.

Figure 7:
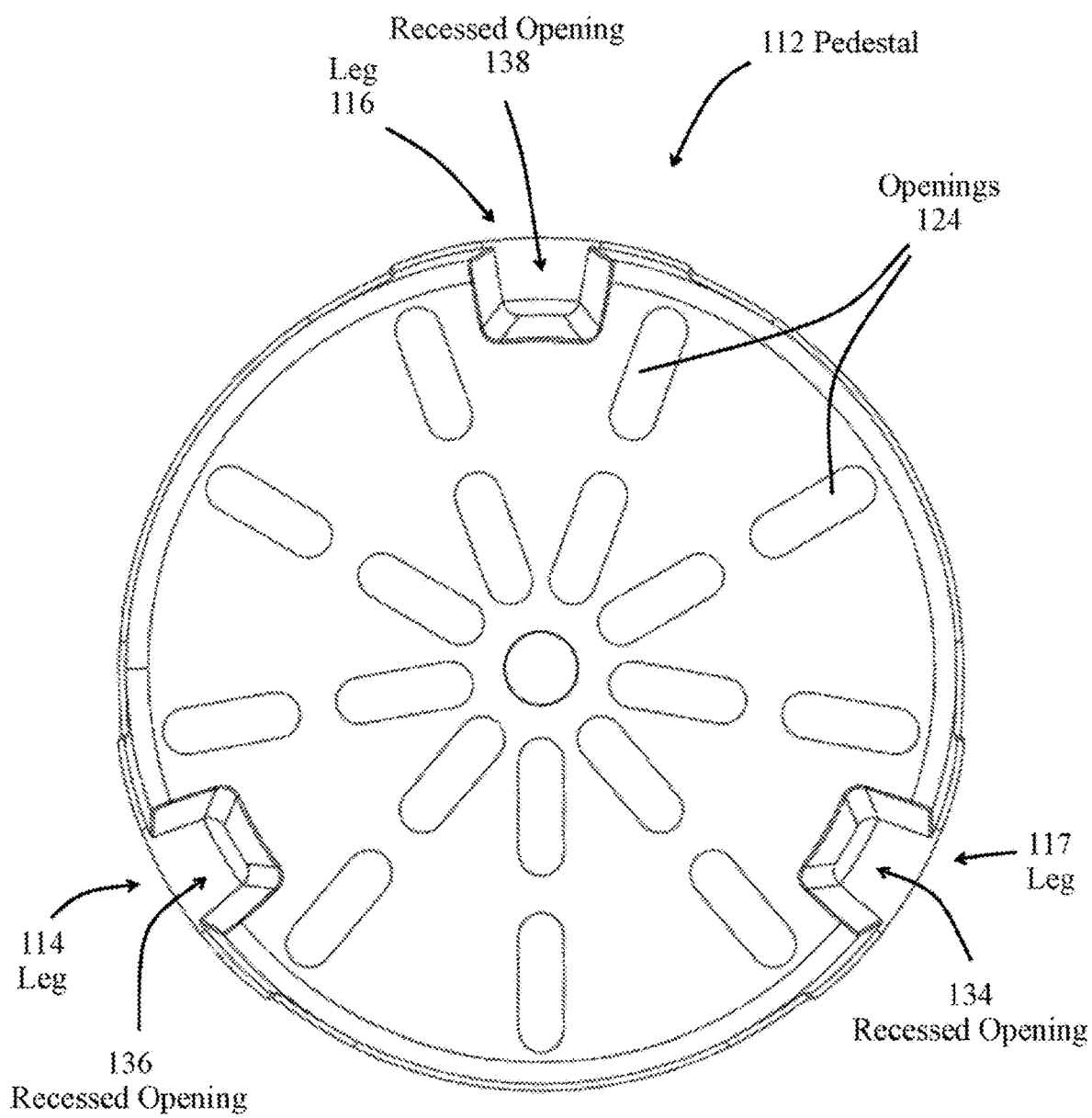
FIG. 7 is a top view of the pedestal of the embodiment of FIG. 1.

FIG. 7 is a top view of the pedestal 112. As illustrated in FIG. 7, the legs 114, 116, 117 have recessed openings 136, 138, 134, respectively. The recessed openings 134, 136, 138 are sufficiently large to allow one or more fingers to be inserted into the top surface portion of the pedestal 112 to allow the pedestal 112 to be grasped and placed in, or removed from, the bucket 102. The pedestal 112 also has a series of openings 124 and a central opening at the center of the curved portion of the pedestal 112. The curvature of the pedestal 112 also allows the pedestal 112 to be inserted in the bucket 102 and not interfere with the portions of the faucet 106 that extend through the side of the bucket 102. The curvature then allows the lower portion of the pedestal to drain to a level that is just above the effluent level 130, as shown in FIG. 4. The openings 124 can be of any desired size or shape to allow the effluent 118 from the organic material 111 to pass through the pedestal to the bottom portion of the bucket 102. The pedestal 112 may be fabricated from any desired material, including a food grade plastic material that can be easily and inexpensively produced. The material should be a food grade quality with a specific gravity of greater than 1.0 that causes the pedestal 112 to not float. In this manner, when the pedestal 112 is placed in the bucket 102, with water in the bucket, the pedestal will sink to the bottom and become firmly seated by legs 114, 116, 117 on the bottom of the bucket 102.

Figure 8:
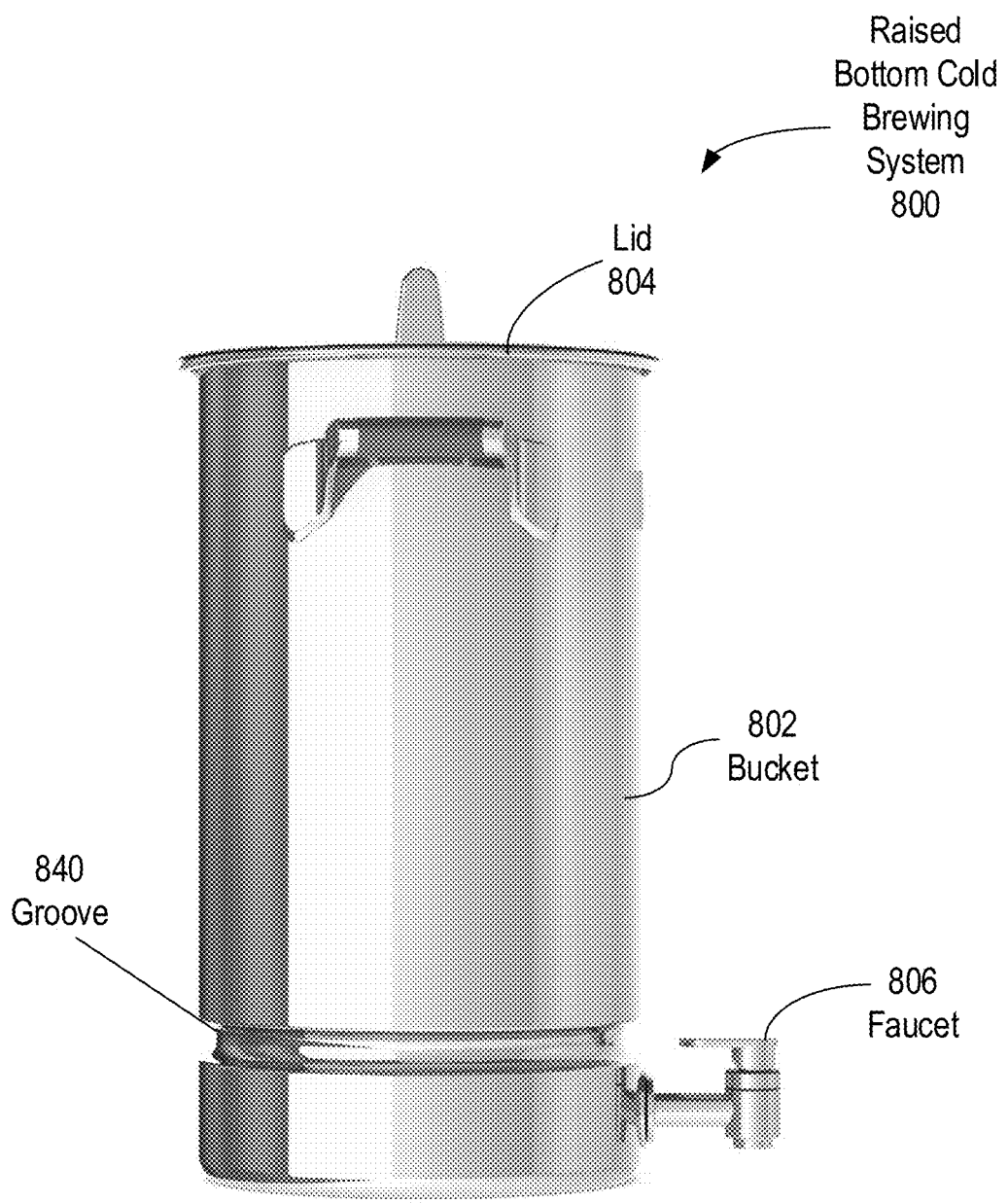
FIG. 8 is a side view of an implementation of an example of a raised bottom cold brewing system in accordance with the present disclosure.
Figure 9:
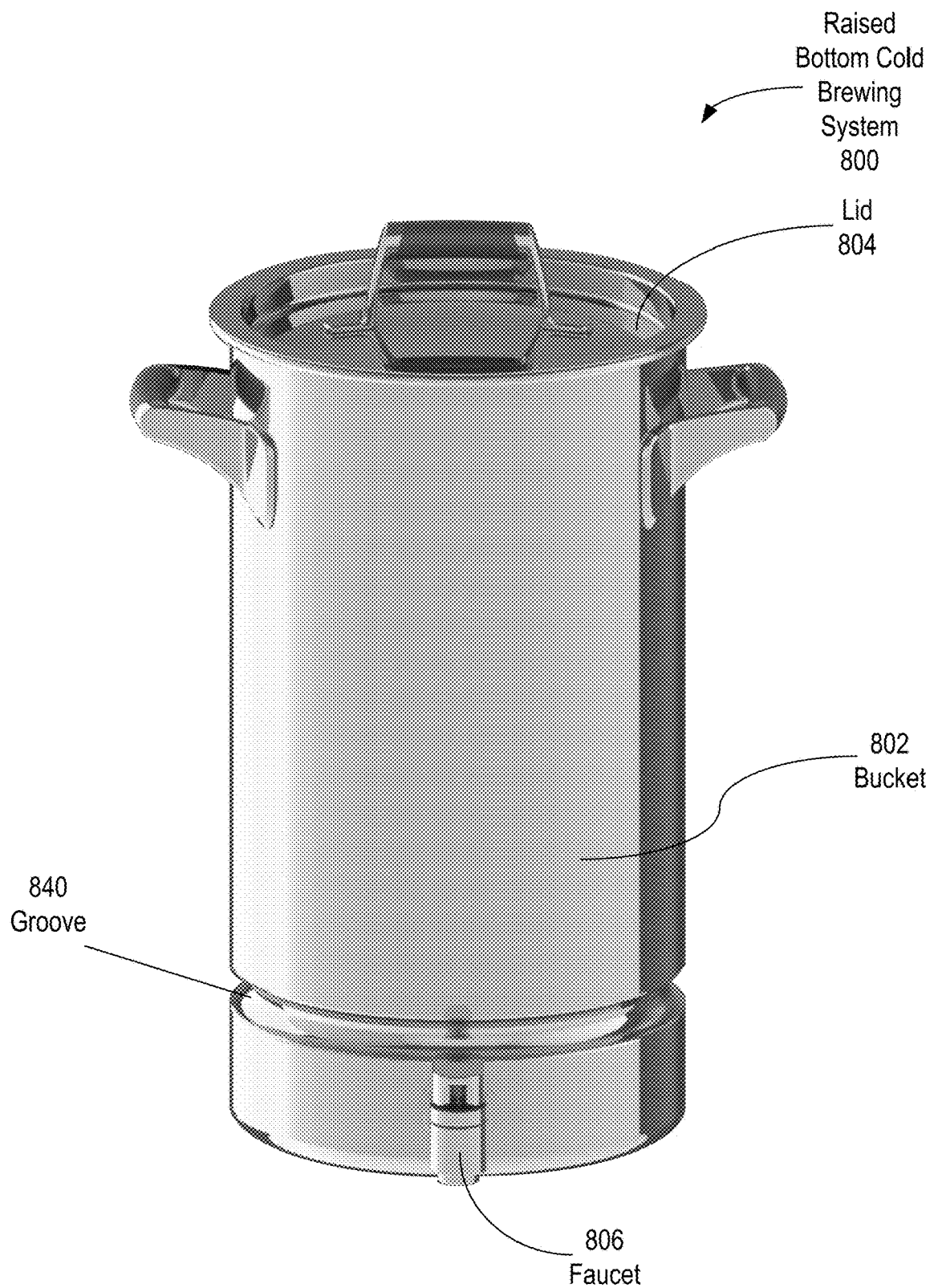
FIG. 9 is a front view of the raised bottom cold brewing system in accordance with the present disclosure.

FIG. 8 is a side view of a raised bottom cold brewing system 800 that comprises another embodiment of the present invention. As illustrated in FIG. 8, the brewing system 800 also comprises a bucket 802 that has a lid 804. As before, a faucet 806 is used to drain the brewed contents (brewed effluent) from the bucket 802. Again, coffee grounds, tea, or other organic material is placed in the bucket 802 and room temperature water is added to the bucket 802. The water is allowed to remain in the bucket 802 for a period of time to create a brewed effluent, which can be drained by the faucet 806. As before, the cold brewing process provides for a brewed effluent that has a pleasing taste, since the cold brewing process, i.e., using room temperature water, extracts the favorable flavoring from the organic materials. In FIG. 9, a front view of the raised bottom cold brewing system 800 is shown in accordance with the present disclosure.

Figure 10:
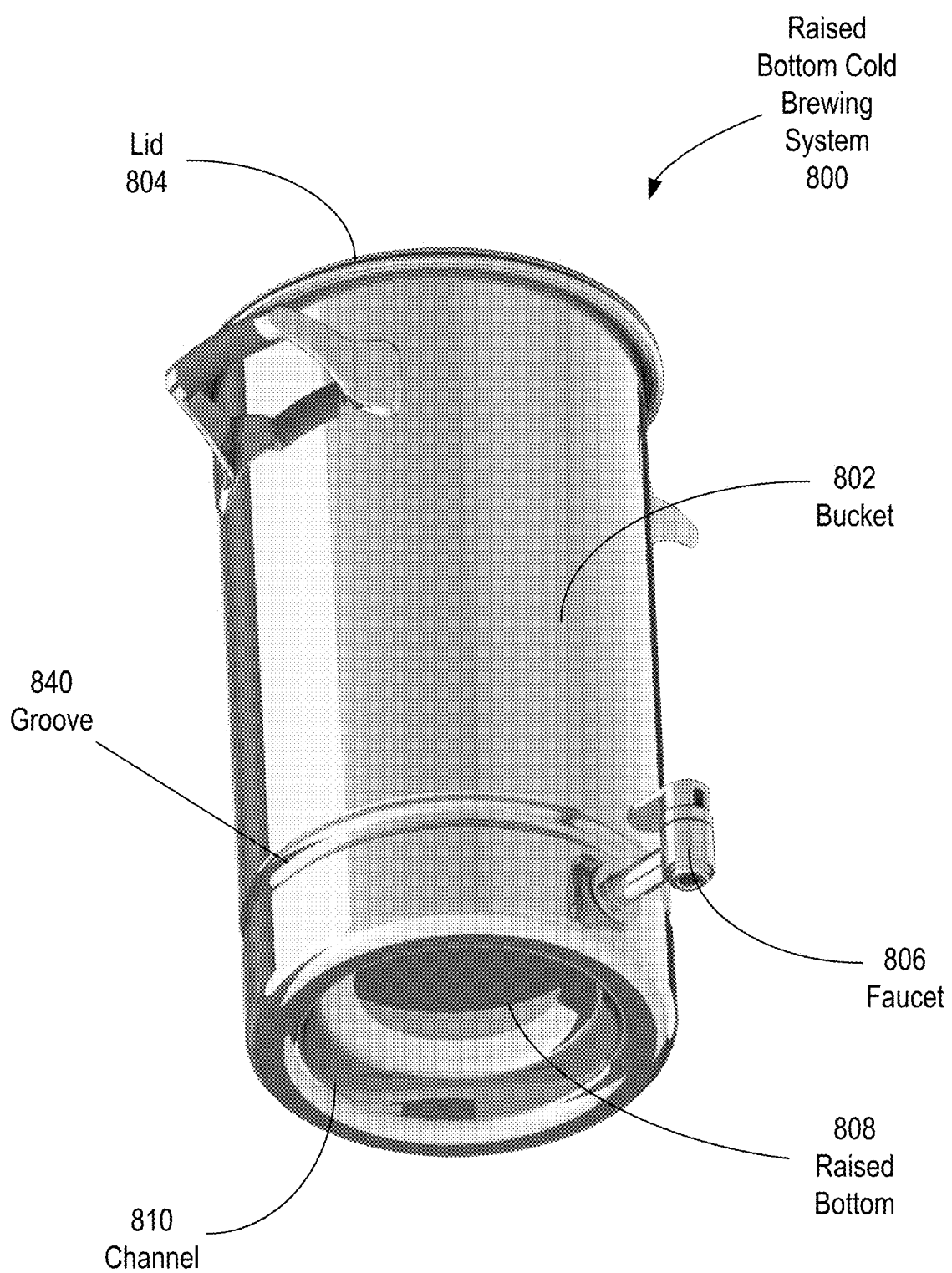
FIG. 10 is a perspective bottom view of the raised bottom cold brewing system shown in FIGS. 8 and 9 in accordance with the present disclosure.
Figure 11:
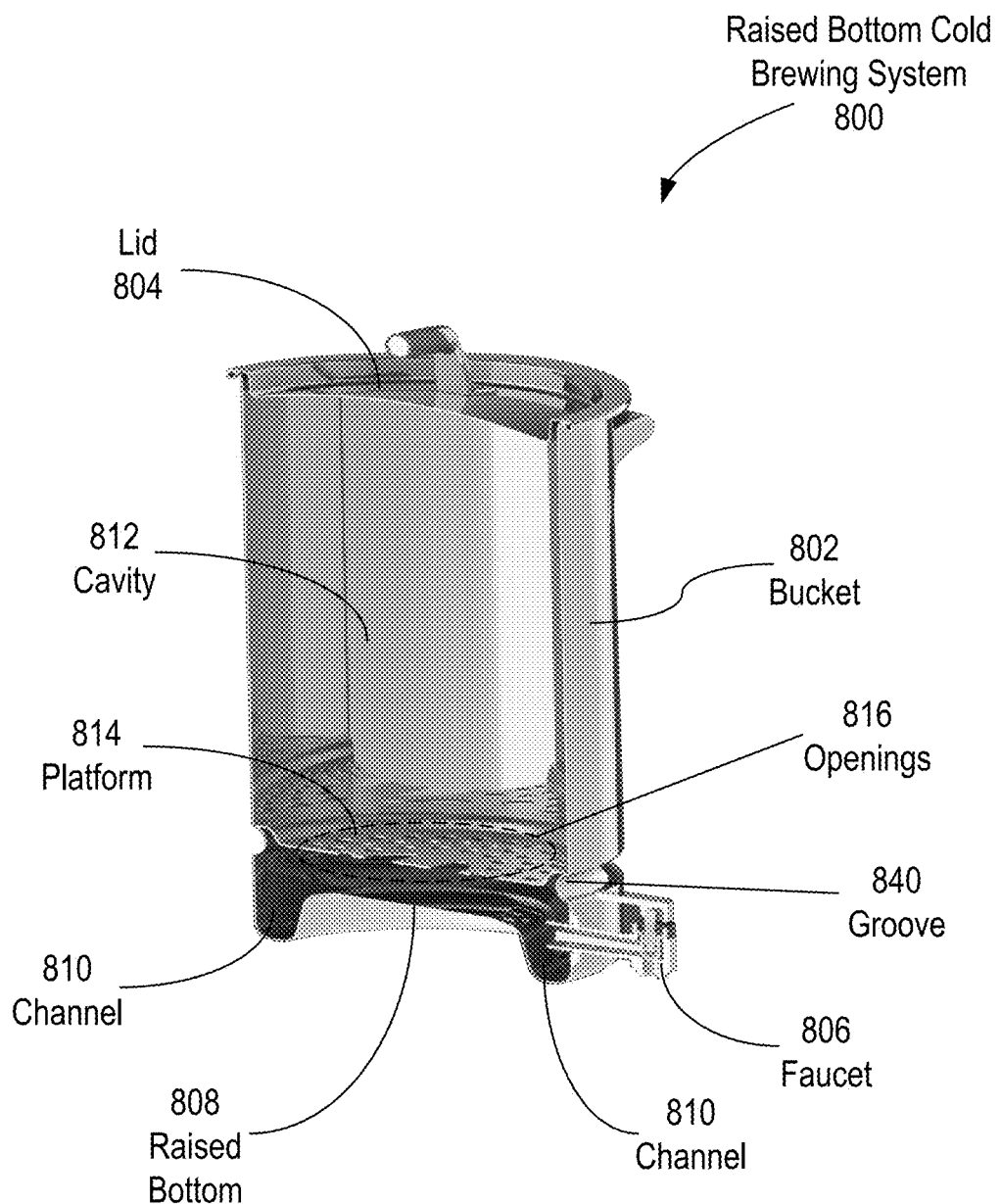
FIG. 11 is a perspective side cutaway view of the raised bottom cold brewing system in accordance with the present disclosure.

In FIG. 10, a perspective bottom view of the raised bottom cold brewing system 800 is shown in accordance with the present disclosure. In this view, the raised bottom cold brewing system 800 comprises a raised bottom 808 and a channel 810. In FIG. 11, a perspective side cutaway view of the raised bottom cold brewing system 800 is shown in accordance with the present disclosure. From this view, it is seen that the raised bottom cold brewing system 800 includes a cavity 812 hold the brewed effluent, a platform 814 for holding a filter bag full of organic material, and the channel 810 that surrounds the raised bottom 808. In this example the faucet 806 is inserted through the wall of the bucket 802 at a located below the platform 814 and at approximately the top of the channel 810. Similar to the pedestal 112, the platform 814 also includes a plurality of openings 816 that are configured to allow the effluent to be drained from the filter bag form an effluent level within the cavity 812 of the bucket 802. In this example, the channel 810 is configured as a collection ring that collects any sediment from the drained effluent so as to have it trapped below the drain opening of the faucet 806. The shape and design of the channel 810 and the location of the faucet 806 may be configured to allow the effluent to be drained without having to tip the raised bottom cold brewing system 800 while at the same time collecting any sediment from the drained effluent.

In this example, similar to the pedestal 112 described earlier, the platform 814 has the series of openings 816, which allow the filter bag to sit on platform 814. The platform 814 may be a flat plate or have a curved or sloped configuration to create maximum yield. Additionally, the platform 814 may be an integral part of the bucket 802 or, alternatively, a removable part that is placed into the cavity 812 and held in place by a retaining feature within the cavity 812. As an example, the retaining feature may include a groove 840 within the wall of the cavity 812, where the groove 840 may be a cylindrical indent ring in the bucket 802. Moreover, the uplifted bottom (i.e., the raised bottom 808) displaces more water into the organic material in the filter bag above the platform 814. This ensures more of the water circulates in the organic material during brewing. The raised bottom 808 also reduces the need to tilt the brewer (i.e., the raised bottom cold brewing system 800) to dispense the effluent below the valve level of the faucet 806. The "moat" shape of the channel 810 that surrounds the raised bottom 808 also collects any sediment that seeps through the filter bag. The sediment settles in the low section of the channel 810 such that when the user drains the effluent, they get only the effluent they want without the sediment. In this example, the raised bottom 808 may be flat or convex in shape to help move any sediment that falls on the raised bottom 808 to move with gravity into the channel 810 for collection. The faucet 806 may be a ball valve or butterfly valve type of faucet. The faucet 806 may also utilize an offset hose barb that allows a user to fine tune the amount of draining that occurs by rotating the position of the barb.

Figure 12:
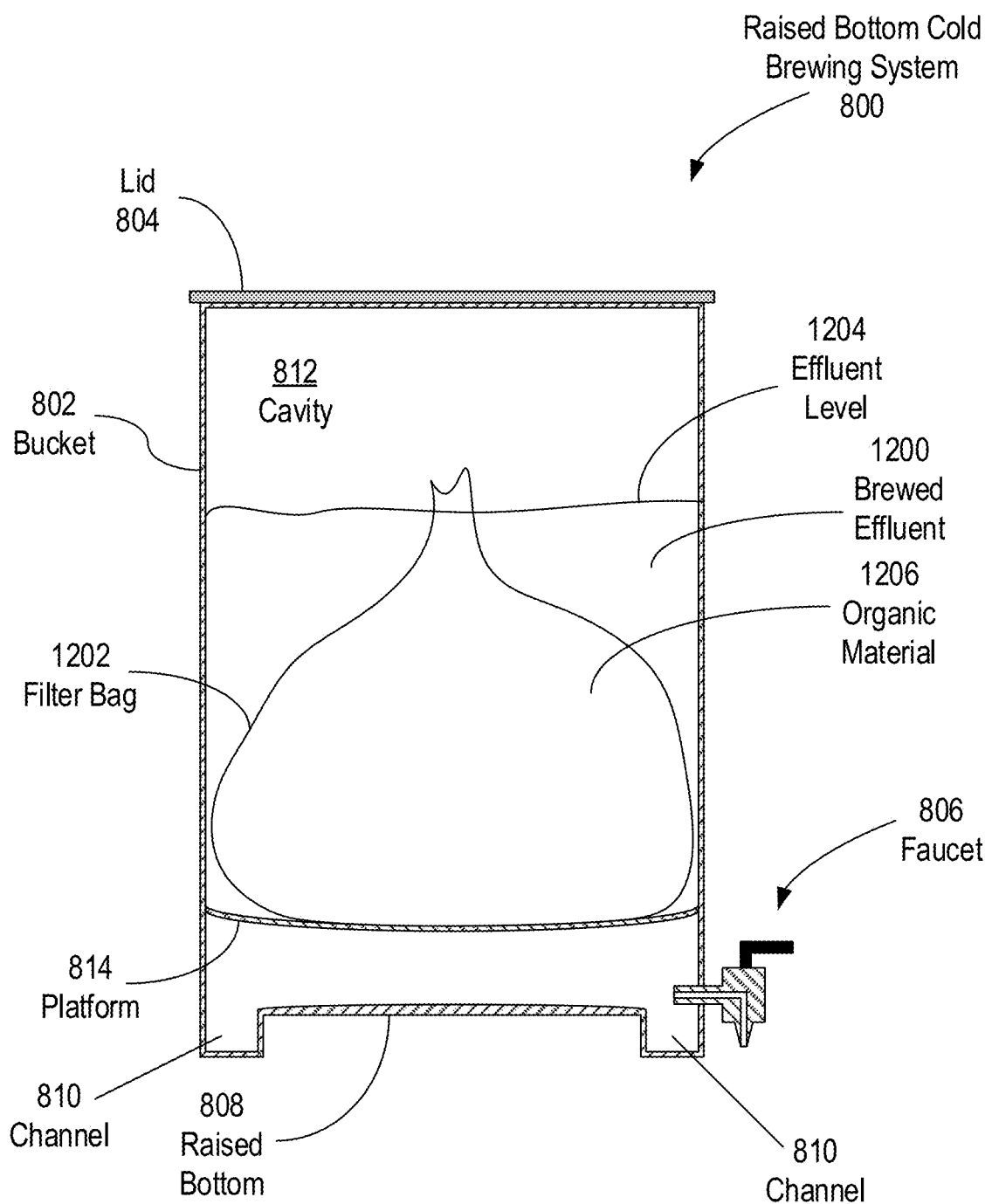
FIG. 12 is a cross-sectional view of the embodiment of FIG. 11 filled with water.

Turning to FIG. 12, a cross-sectional view of the raised bottom cold brewing system 800 is shown filled with water in accordance with the present disclosure. In this example, the brewed effluent 1200 is produced within the cavity 812 of the bucket 802 of the raised bottom cold brewing system 800. In a method of operation, A filter bag 1202 is placed in the bucket 802 on the platform 814. Water is placed in the cavity 812 of the bucket 802 to the effluent level 1204, which surrounds the filter bag 1202 and the organic material 1206 that is in the filter bag 1202. Again, the organic material 1206 can be any desired organic material, including ground coffee beans, tea, or other organic material that can release flavorful effluents for consumption as a beverage or for medicinal purposes. The water can be room temperature water or may vary only slightly in temperature above or more significantly below room temperature. The water interacts with the organic material 1206 and produces the brewed effluent 1200 by extracting the favorable flavorings of the organic material 1206 with very few acids or harsh tannins or oils. Again, a typical brewing process may take anywhere from several hours up to 24 hours. The filter bag 1202 sits on platform 814, which may be curved downwardly toward the center of the platform 814. The platform 814 has a series of openings 816, which allow the filter bag 1202 to sit on platform 814 in a curved or sloped configuration to create maximum yield. The raised bottom 808 displaces more water into the organic material 1206 in the filter bag 1202. Any sediments drained from the filter bag 1202 fall into the channel 810 and on to the top of the raised bottom 808 which slide down into the channel 810.

Faucet 806 is then used to drain the brewed effluent 1200 from the bucket 802 into another container after the brewing process is completed. Since the faucet 806 located below the platform 814 but at approximately the top of the channel 810, the faucet 806 is capable of draining most of the brewed effluent 1200 from the bucket 802 without any sediment from the organic material 1206 that may have leaked out if the filter bag 1202 has one or more holes.

Figure 13:
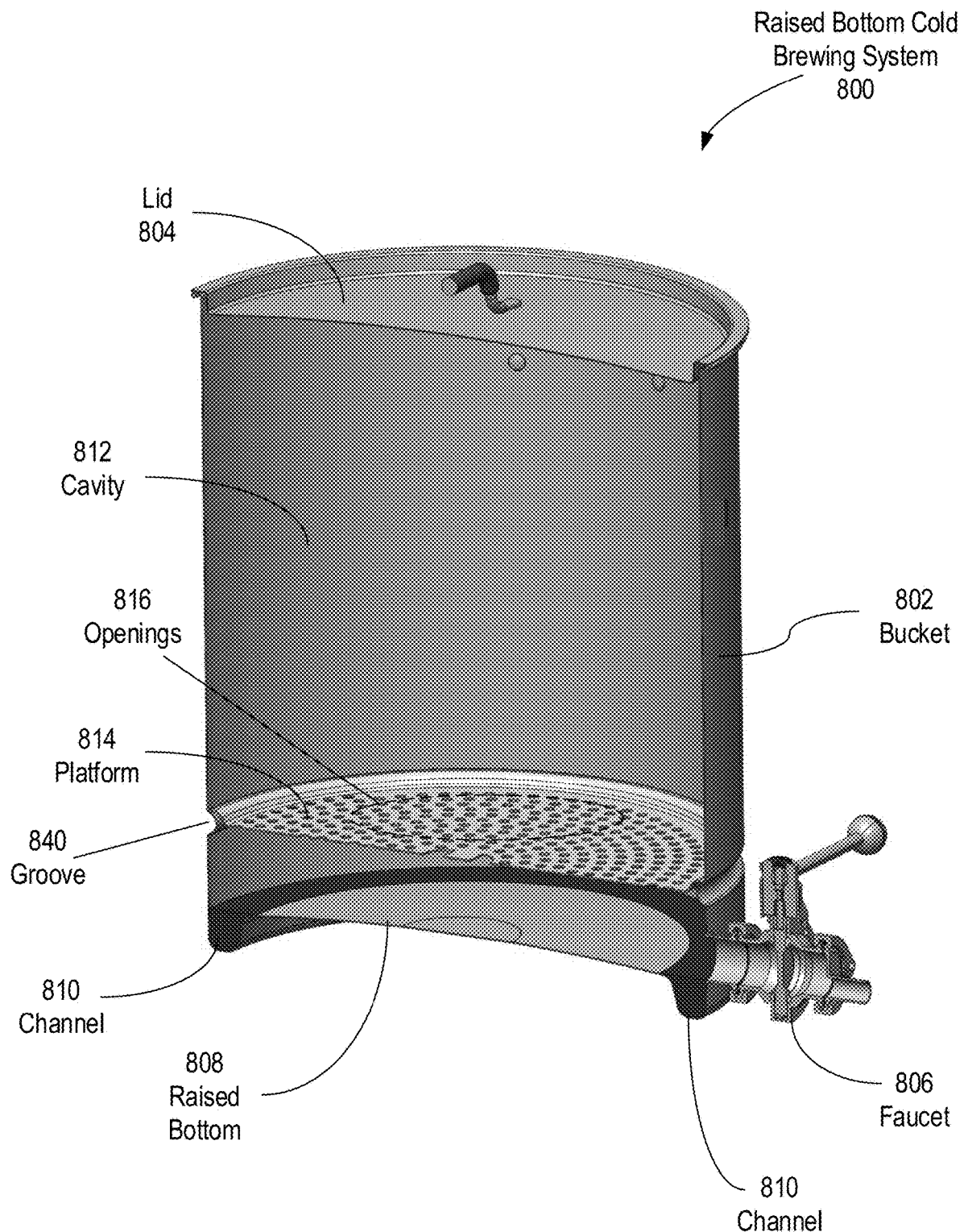
FIG. 13 is another perspective side cutaway view of the raised bottom cold brewing system in accordance with the present disclosure.
Figure 14:
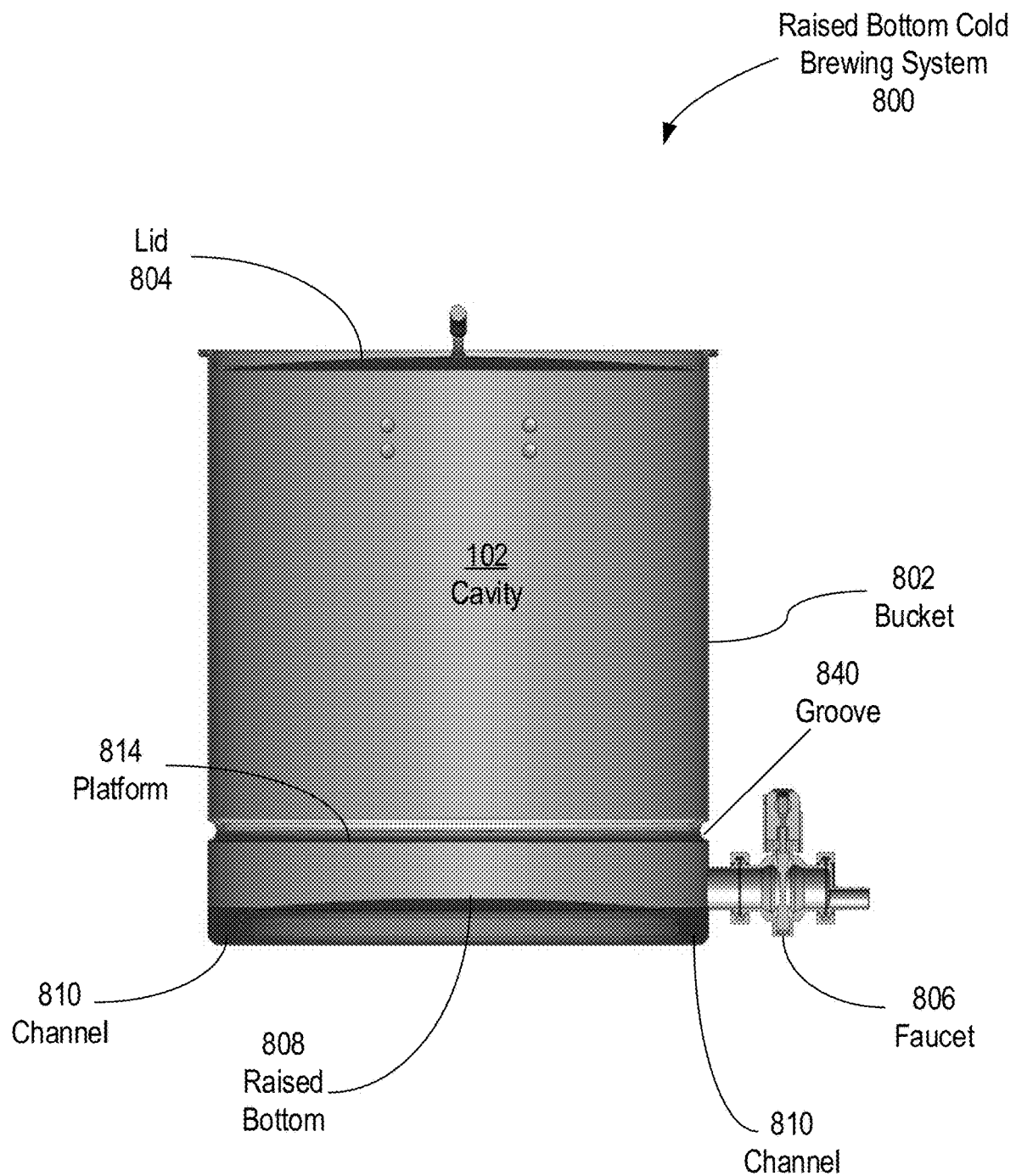
FIG. 14 is a side cutaway view of the raised bottom cold brewing system shown in FIG. 13 in accordance with the present disclosure.

In FIG. 13, another perspective side cutaway view of the raised bottom cold brewing system 800 is shown in accordance with the present disclosure. FIG. 14 is a side cutaway view of the raised bottom cold brewing system 800.

It is appreciated by those of ordinary skill in the art that the raised bottom cold brewing system 800 shown in FIGS. 8 through 14 may be constructed of metal, however, the raised bottom cold brewing system 800 may also be constructed of over material such as, for example, plastic or ceramic.

Figure 15:
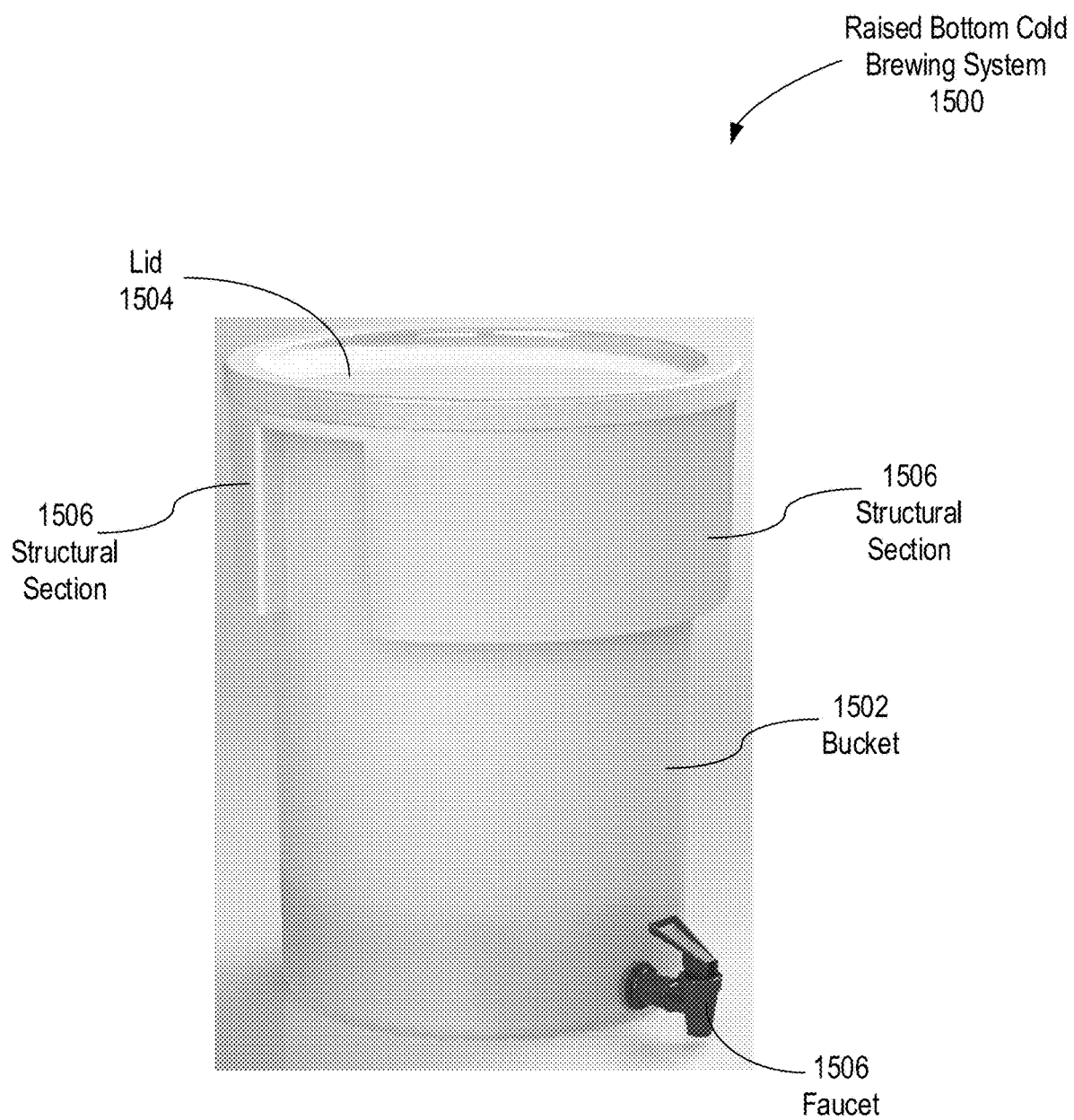
FIG. 15 is a perspective side view of an implementation of an example of another raised bottom cold brewing system in accordance with the present disclosure.
Figure 16:
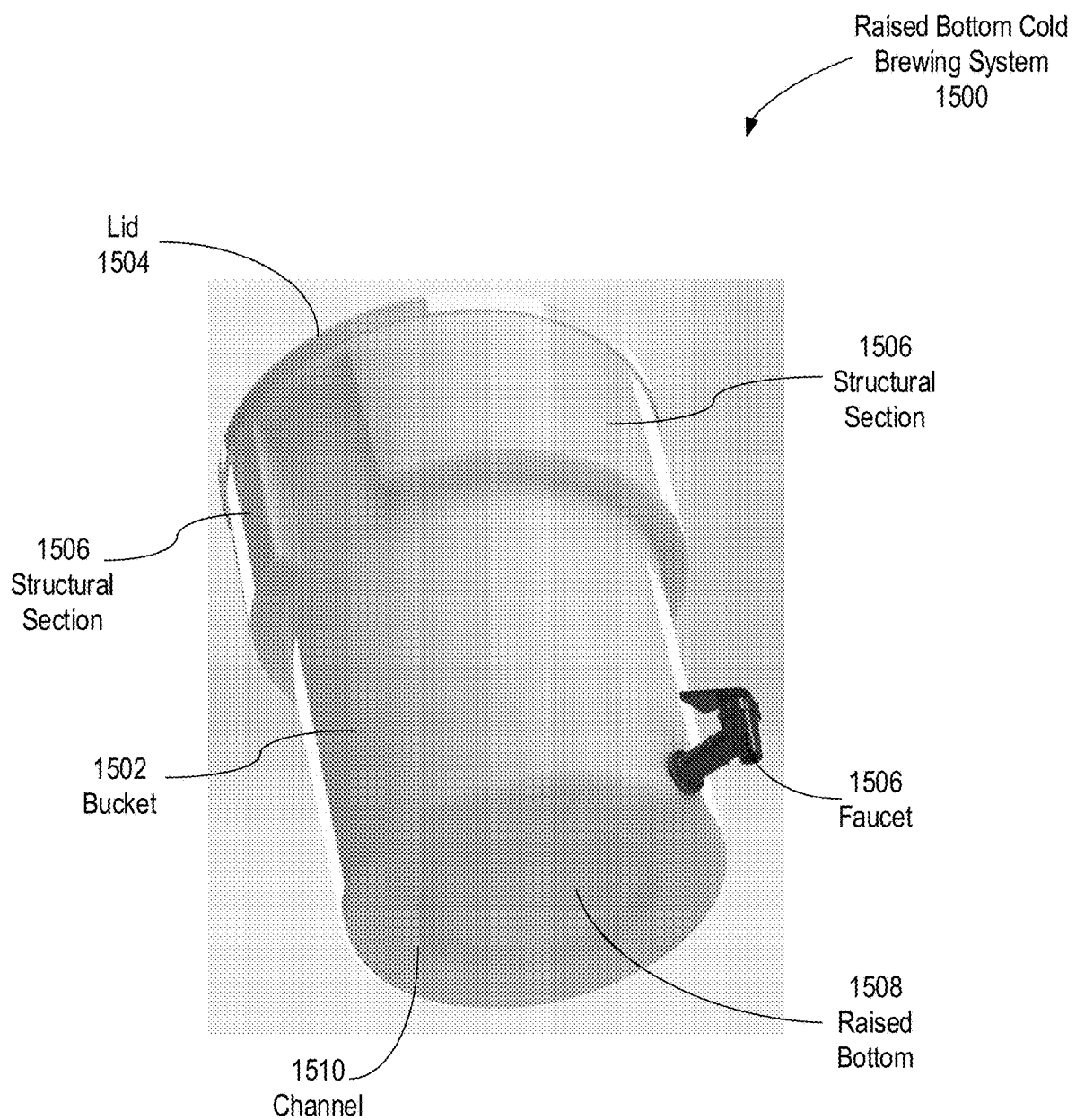
FIG. 16 is a perspective bottom view of the raised bottom cold brewing system shown in FIG. 15 in accordance with the present disclosure.

Turning FIG. 15, a perspective side view of an implementation of an example of another raised bottom cold brewing system 1500 is shown in accordance with the present disclosure. In this example, the raised bottom cold brewing system 1500 may be manufactured from plastic and would include a bucket 1502, lid 1504, and faucet 1506 were all these parts may also be manufactured from plastic. In this example, the raised bottom cold brewing system 1500 may also include a structural section 1508 for holding and/or picking up the raised bottom cold brewing system 1500. FIG. 16 is a perspective bottom view of the raised bottom cold brewing system 1500 in accordance with the present disclosure. In this view, the raised bottom cold brewing system 1500 includes a raised bottom 1508 and channel 1510.

Figure 17:
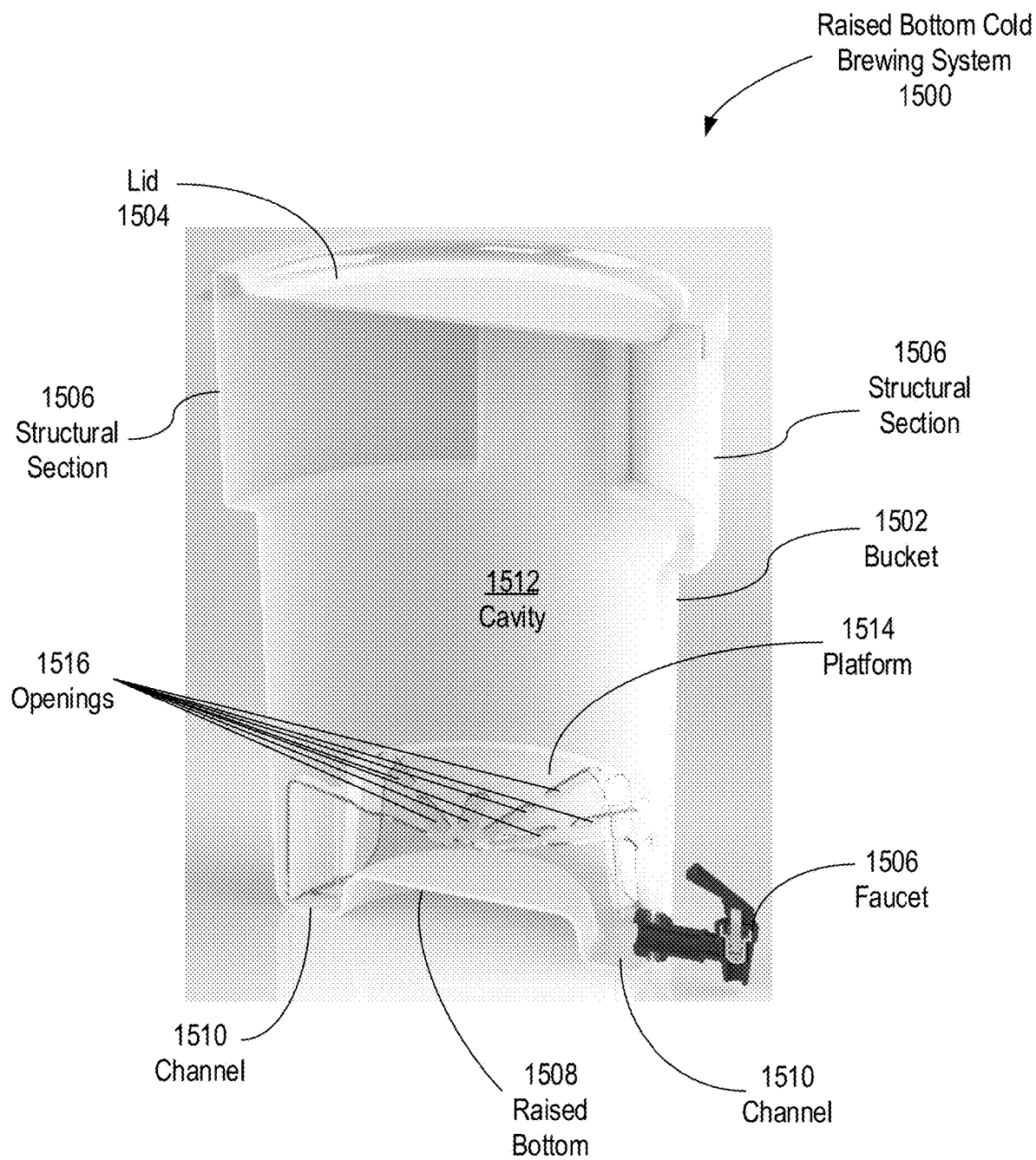
FIG. 17 is a perspective side cutaway view of the raised bottom cold brewing system shown in FIG. 15 in accordance with the present disclosure.

In FIG. 17, a perspective side cutaway view of the raised bottom cold brewing system 1500 is shown in accordance with the present disclosure. Similar to the previous examples, the raised bottom cold brewing system 1500 includes a cavity 152 within the bucket 1502 and platform 1514 having a plurality of openings 1516. In this example, the platform 1514 may be an integral part of the bucket 1502 (similar to the examples shown in relation to FIGS. 8 through 14) or a separate pedestal similar to pedestal 112 that may be placed into the bottom portion of the cavity 1512. In general, the raised bottom cold brewing system 1500 operates with the same method as the raised bottom cold brewing system 800 described previously.

It will be understood that various aspects or details of the disclosure may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure. Moreover, although the techniques have been described in language specific to structural features and/or methodological acts, it is to be understood that the appended claims are not necessarily limited to the features or acts described. Rather, the features and acts are described as example implementations of such techniques.

Furthermore, the description of the different examples of implementations has been presented for purposes of illustration and description, and is not intended to be exhaustive or limited to the examples in the form disclosed. Many modifications and variations will be apparent to those of ordinary skill in the art. Further, different examples of implementations may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

It will also be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a block diagram.

The description of the different examples of implementations has been presented for purposes of illustration and description, and is not intended to be exhaustive or limited to the examples in the form disclosed. Many modifications and variations will be apparent to those of ordinary skill in the art. Further, different examples of implementations may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

What is claimed is:

1. A raised bottom cold brewing system comprising:
   a bucket having a top side, a cavity, a platform within the cavity, and a bottom side,
      wherein the bottom side of the bucket includes a raised bottom and a channel surrounding the raised bottom and
      wherein the platform includes a plurality of openings; and
   a lid configured to be placed on top side of the bucket; and
   a faucet below the platform and above the raised bottom and channel.

2. The raised bottom cold brewing system of claim 1, wherein the platform is removable and rests on a retaining feature within the cavity.

3. The raised bottom cold brewing system of claim 2, wherein the retaining feature is a cylindrical indent ring in the bucket.

4. The raised bottom cold brewing system of claim 2, wherein the platform is a pedestal having legs that are placed within the channel.

5. The raised bottom cold brewing system of claim 1, wherein the platform is an integral part of the bucket.

6. The raised bottom cold brewing system of claim 1, wherein the bucket, lid, and faucet are constructed of a food grade material.

7. The raised bottom cold brewing system of claim 6, wherein the bucket, lid, and faucet are constructed of metal.

8. The raised bottom cold brewing system of claim 6, wherein the bucket, lid, and faucet are constructed of plastic.

9. The raised bottom cold brewing system of claim 1, wherein the channel is configured to collect sediment from a filter bag placed on the platform and being brewed in the bucket to produce an effluent, wherein the filter bag is filled with organic material.

10. The raised bottom cold brewing system of claim 9, wherein the raised bottom is convex and is configured to slide sediment from the raised bottom to the channel.

11. The raised bottom cold brewing system of claim 9, wherein the platform has a curved surface that is curved downwardly towards a middle portion of the platform so that effluent drains towards a central portion of the platform and the effluent is concentrated towards a middle portion of the filter bag to facilitate yield.

12. The raised bottom cold brewing system of claim 9, wherein the platform has a flat surface.

13. A method of brewing a brewed effluent in a raised bottom cold brewing system that removes harsh acids and harsh oils in the brewed effluent comprising:
   placing an organic material, used to create the brewed effluent, in a filter bag;
   placing the filter bag on a platform disposed in a bucket, wherein the bucket includes a cavity, and a bottom side having a raised bottom and channel surrounding the raised bottom and the platform includes a plurality of openings;
   placing water in the bucket that interacts with the organic material to create the brewed effluent;
   drawing the brewed effluent from the bucket to a minimum effluent level, using a faucet disposed in the bucket below the platform and approximately at a top of the channel, wherein the platform is above the minimum effluent level;
   allowing the organic material to drain for a period of time after the brewed effluent is drained to the minimum effluent level;

allowing any sediment from the organic material to settle into the channel; and removing the filter bag without squeezing or pushing on the filter bag to prevent the harsh oils and the harsh acids from entering the brewed effluent.

14. The method of claim 13, wherein the platform has a flat surface.

15. The method of claim 13, wherein the platform has a curved surface that is curved downwardly towards a middle portion of the platform so that effluent drains towards a central portion of the platform and the effluent is concentrated towards a middle portion of the filter bag to facilitate yield.

16. The method of claim 15, wherein the platform that is removable and rests on a retaining feature within the cavity of the bucket and the platform rests at a height from the raised bottom that is sufficiently high to not engage the faucet and causes the platform to be disposed above the minimum effluent level.

17. The method of claim 15, further comprising using a pedestal for the platform that is sufficiently tall to not engage the faucet and has a curvature that causes the central portion of the pedestal to be disposed above the minimum effluent level.

18. The method of claim 13 further comprising using a bucket that is made from a food grade material.

* * * * *